July 2, 1929.　　　　A. HOPKINS　　　　1,719,659
HEATING AND VENTILATING APPARATUS
Filed Sept. 6, 1927　　2 Sheets-Sheet 1
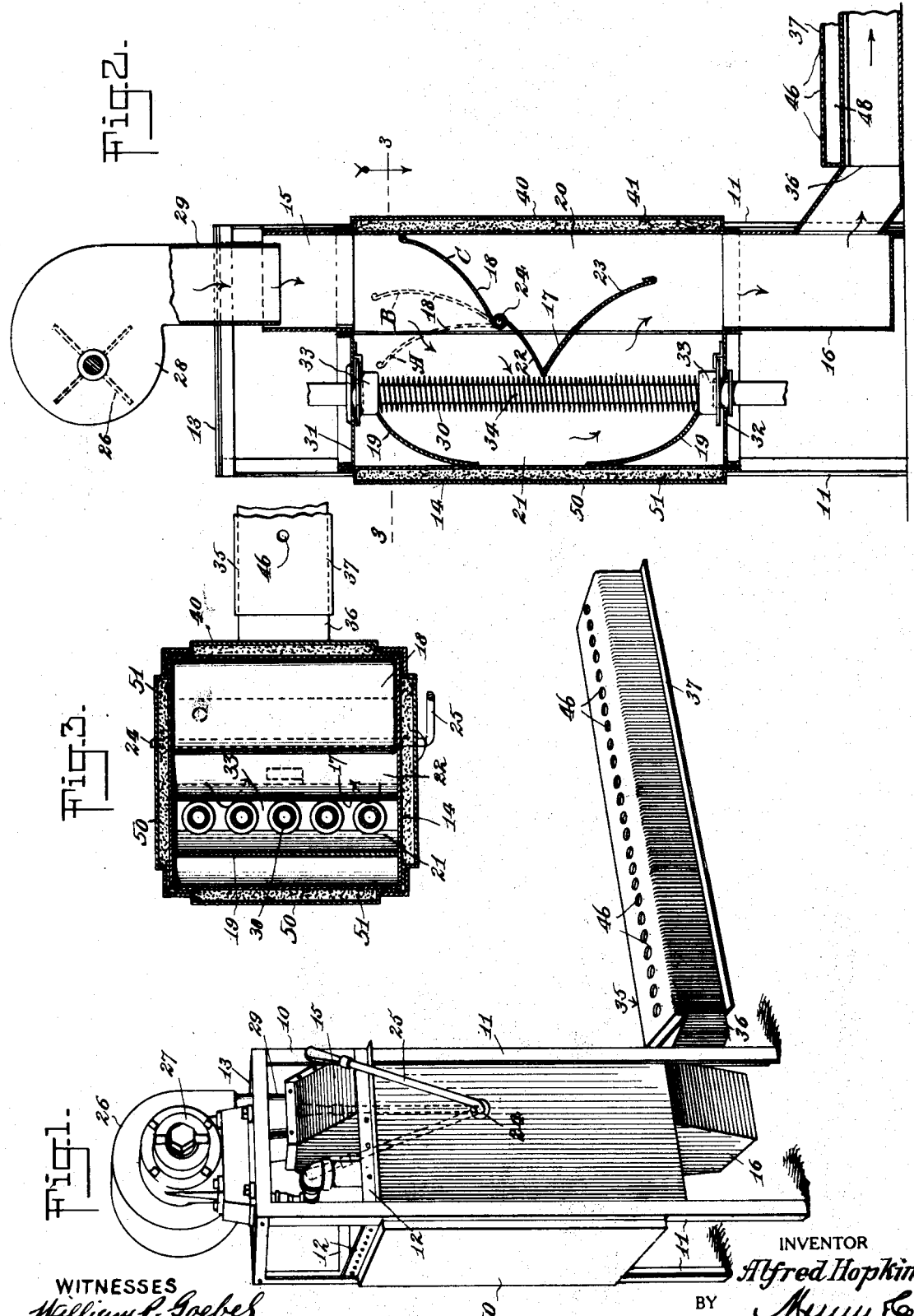
INVENTOR
Alfred Hopkins
BY
ATTORNEYS INVENTOR
Alfred Hopkins
BY
ATTORNEYS Patented July 2, 1929.

1,719,659

UNITED STATES PATENT OFFICE.

ALFRED HOPKINS, OF BOSTON, MASSACHUSETTS, ASSIGNOR TO HOPKINS-TULL MACHINERY CO., OF PHILADELPHIA, PENNSYLVANIA, A CORPORATION OF PENNSYLVANIA.

HEATING AND VENTILATING APPARATUS.

Application filed September 6, 1927. Serial No. 217,734.

This invention relates to an apparatus which may be used as a drier, temperature regulator, and ventilator.

One of the objects of the present invention is the provision of an apparatus suitable for use for a dry room, cabinet, offices and dwellings where different temperatures are required, and for regulating fresh air for the purpose of ventilating.

Another object of the invention is the provision of an apparatus adapted to create a current of comparatively cool fresh air, for heating the air, for controlling the flow of air to obtain either hot or cool streams of air, or a mixture of both hot and cool air to produce warm air, and for distributing the air issuing from the apparatus.

With the foregoing and other objects in view, the invention resides in the particular provision, relative disposition, and functions of the parts hereinafter fully described and illustrated in the accompanying drawing, in which—

Figure 1 is a perspective view of an apparatus embodying the features of the present invention.

Fig. 2 is a vertical sectional view of the apparatus.

Fig. 3 is a horizontal sectional view taken on the line 3—3 of Fig. 2.

Figure 4:
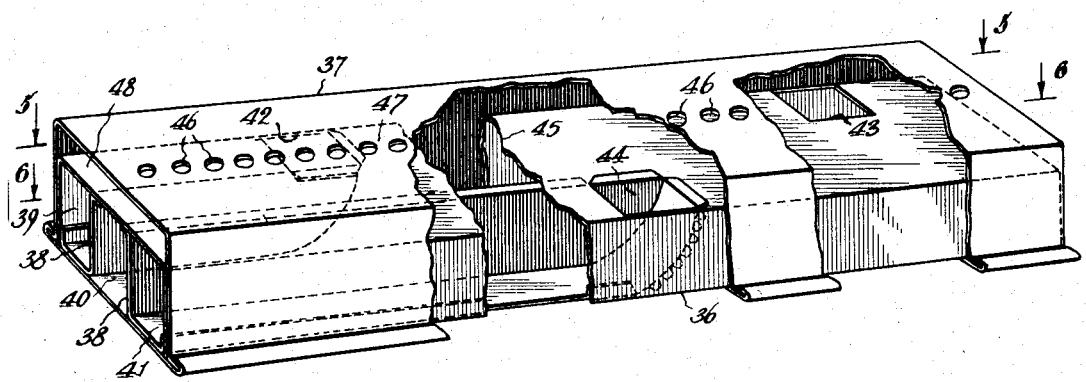
Fig. 4 is a perspective view of the air distributor conduit, portions being broken away to better illustrate certain structural features.
Figure 5:
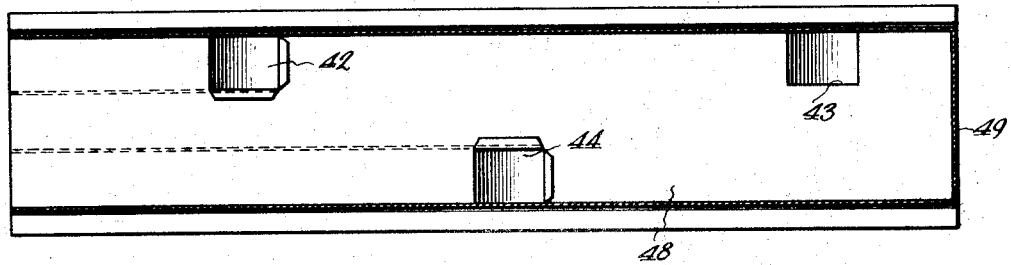
Fig. 5 is a longitudinal sectional view taken on the line 5—5 of Fig. 4.
Figure 6:
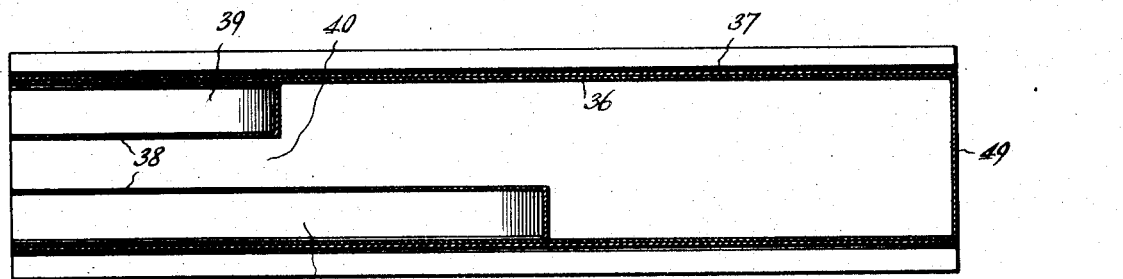
Fig. 6 is a longitudinal sectional view taken on the line 6—6 of Fig. 4.

The apparatus of the present invention will consist of a single unit which may advantageously be arranged in, or arranged remote from but connected with a room, cabinet, or other place where different temperatures are required, and for carrying out drying operations, and ventilating operations.

The apparatus in the illustrated embodiment of the invention includes a frame 10 consisting of uprights 11 in the form of angle irons connected together by members 12 and a top 13. A suitable casing 14 is supported by the uprights 11 of the frame 10. The casing 14 has an air intake or inlet 15 at the top thereof, an air outlet 16 at the bottom thereof in vertical alignment with the air intake 15, and arranged within the casing is a baffle 17 and a damper 18 which combine with the walls, including the curved walls 19 of the casing to provide a duct 20 between the intake 15 and outlet 16, and a by-pass 21 which communicates with the duct 20. The baffle 17 is of angular construction so as to provide deflecting portions 22 and 23.

The damper 18 is pivotally mounted as at 24, and has connected therewith a handle 25 which is arranged exteriorly of the casing 14 for moving the damper to different positions, indicated at A, B and C, for a purpose to appear.

In order to produce a current of comparatively cool and fresh air and to force it into the air intake 15 of the casing there is provided a fan 26 which is driven by an electric motor 27. The fan 26 and motor 27 in association are arranged on the top 13 of the frame 10. The casing 28 of the fan 26 has an outlet 29 which enters the air intake 15 of the casing 14.

In order to heat the comparatively cool air entering the casing 14 there is provided a heater 30 of any preferred type. The heater 30 in the present instance is a steam heater. The heater 30 is supported by the top and bottom walls 31 and 32 respectively of the casing 14. The heater consists of headers 33 and a series of copper finned tubes 34 connected in communication with the headers 33.

In order to distribute the air issuing from the apparatus there is provided means consisting of a duct or conduit 35 consisting of interfitting sections 36 and 37. The section 36 is connected with the air outlet 16 in any suitable manner. The section 36 is divided by longitudinally disposed partitions 38 to provide different length passages 39, 40 and 41 which communicate respectively with openings 42, 43 and 44 in the top wall 45 of the section 36. The main section 37 is provided with a series of openings 46 in the top wall 47 thereof through which the air passes into the room or compartment for the purposes mentioned. The air first enters the passages 39, 40 and 41 in the section 36, then enters the space 48 extending the entire length of the conduit between the top walls 45 and 47 respectively of the sections 36 and 37, thru the openings 42, 43 and 44, and then passes through the openings 46. One end of the section 36 is closed as at 49. The conduit 35 may be designed to suit any particular condition.

From the foregoing, it will be apparent that, when the damper 18 is moved to the position indicated at A in dotted lines, the comparatively cool fresh air forced into the casing 14 through the air intake 15 will be compelled to pass through the duct 20, through the outlet 16 into the distributor conduit 35, and will issue in streams from the openings 46 in its cool condition. When the damper 18 is moved to the position indicated at B in dotted lines, the comparatively cool air entering the casing 14 through the intake 15 will be divided into currents respectively flowing into the by-pass 21 and the duct 20. The current of air entering the by-pass 21 will be heated by the heater 30, whereas, the current of air flowing through the duct 20 will not be materially affected by the heat, due to rapid circulation. The heated current of air will flow and be mixed with the comparatively cool current of air at a point directly above the outlet 16. As a consequence warm air will be flowing into the conduit 35 to be distributed thereby in streams. When the damper 18 is in the position shown at C in full lines all of the cool air entering the casing 14 through the air intake 15 will be caused to enter the by-pass 21. This air will be heated by the heater 30 and will pass from the lower end of the by-pass 21 directly into the air outlet 16 into the conduit 35 to be distributed thereby in streams in a heated condition.

From the foregoing it will be understood that the apparatus of the present invention serves for producing a flow of air of different temperatures, either cool air, hot air, or warm air; and that the apparatus may be used for ventilating, for varying the temperature in a room or compartment, and for carrying out drying operations particularly when heated air is caused to issue from the apparatus.

The walls of the casing 14 may be provided with a jacket 50 in which suitable heat insulating material 51 may be placed. The damper 18 may also be controlled by a thermostat to give a constant temperature.

I claim:

1. An apparatus for optionally inducing a current of comparatively cool, hot, or warm air, said apparatus having an outlet for the current of air and in combination, means connected with the apparatus for distributing the air, said means consisting of a perforated main duct, and a plurality of ducts of different lengths communicating with the outlet of the apparatus and with the main duct.

2. An apparatus for optionally inducing a current of comparatively cool, hot, or warm air, said apparatus having an outlet for the current of air, and in combination, a conduit of interfitted sections connected with said apparatus for distributing the air, one of said sections formed to provide passages of different lengths each of which communicates with said outlet at one end and its opposite end communicating with a space between the sections extending the entire length thereof, and the other section having one or more air outlets communicating with said space.

ALFRED HOPKINS.